United States Patent [19]
Vandersluis et al.

[11] Patent Number: 4,929,011
[45] Date of Patent: May 29, 1990

[54] GRAPPLE FIXTURE

[75] Inventors: Ron Vandersluis, Bramalea; Erik Quittner, Toronto, both of Canada

[73] Assignee: National Research Counsil of Canada/Conseil National de Recherches du Canada, Ottawa, Canada

[21] Appl. No.: 338,156

[22] Filed: Apr. 14, 1989

Related U.S. Application Data

[63] Continuation-in-part of Ser. No. 152,392, Feb. 4, 1988, abandoned.

[51] Int. Cl.$^5$ .......................... B25J 19/00; B64G 1/64
[52] U.S. Cl. ................... 294/86.4; 244/161; 294/1.1; 901/30
[58] Field of Search .............. 294/1.1, 67.1, 68.3, 294/81.1, 81.4, 82.26, 82.32, 86.4, 90, 106; 244/115, 116, 137.1, 158 R, 159, 161; 414/729, 731, 736; 901/30, 41, 45, 50

[56] References Cited

U.S. PATENT DOCUMENTS

| | | | |
|---|---|---|---|
| 3,666,216 | 5/1972 | Nagy et al. | 294/86.4 X |
| 4,105,241 | 8/1978 | Mee | 294/86.4 |
| 4,119,051 | 10/1978 | Orndorff | 244/161 X |
| 4,195,804 | 4/1980 | Hujsak et al. | 244/161 |
| 4,391,423 | 7/1983 | Pruett et al. | 294/86.4 X |
| 4,500,057 | 2/1985 | Duwelz | 244/161 |
| 4,585,388 | 4/1986 | Gossain et al. | 414/729 X |
| 4,607,815 | 8/1986 | Turci et al. | 244/161 |
| 4,750,769 | 6/1988 | Tebb | 294/86.4 |

*Primary Examiner*—Johnny D. Cherry
*Attorney, Agent, or Firm*—Francis W. Lemon

[57] ABSTRACT

The grapple fixture, with improved docking and engaging capabilities, is provided for use with, for example, a relocatable space station remote manipulator system. The grapple fixture is for use with an end effector having grappling capabilities and latching capabilities and which may include a force moment sensor which can cooperate with the arm in order to align the end effector with the grapple fixture without the aid of a grappling mechanism. The grapple fixture comprises a base, having a flange and a cylinder with an end effector abutment face, a plurality of end effector latching trunnions extending radially from the cylinder, a cone-shaped, grapple fixture aligning body with a cylindrical, end effector locating base portion attached to the abutment face, and a plurality of laterally extending, grapple fixture recess engaging, rounded shoulders spaced around the cylindrical base.

6 Claims, 17 Drawing Sheets

**LEGEND FOR/
SSRMS END EFFECTOR AND GRAPPLE FIXTURE
INTERFACE ARCHITECTURE**

INTERFACE TYPES

(OOR) ON ORBIT REPLACEABLE (SUBCLASSES ARE)
(EVA) EXTRA VEHICULAR ACTIVITY
(IVA) INTRA VEHICULAR ACTIVITY
(SPDM) REPLACEABLE BY SPDM (OPTION REQUIRING MUCH STUDY)

(GG) DRIVE GEAR TO DRIVEN GEAR INTERFACE
(NO DISSASSEMBLY FOR SEPERATION)

(EL) ELECTRICAL INTERFACE - POWER AND SIGNAL CABLES (ME) MECHANICAL INTERFACE      (MEC) MECHANICAL TO CAPTURE GRAPPLE FIXTURE

[ - - - ] OPTIONAL SUBSYSTEM

[     ] SUBSYSTEM OR COMPONENT

[T] THERMAL PROTECTION OF A COMPONENT OR SUBSYSTEM

FMS    =    FORCE MOMENT SENSOR

SSRMS  =    SPACE STATION REMOTE MANIPULATOR SYSTEM

CCTV   =    CLOSED CIRCUIT TELEVISION

FIG.17

FMS BETWEEN
WRIST ROLL JOINT
AND EE STRUCTURE
WITH SEPARATE
LOCKOUT MECHANISMS

GRAPPLE FIXTURE

This application is a continuation-in-part application of copending application Ser. No. 07/152,392, filed February 4, 1988, now abandoned, which is specifically incorporated herein by reference.

This invention relates to a grapple fixture.

Prior Art

A grapple fixture and an end effector, of the type which incorporates a grappling device, are disclosed in U.S. Pat. No. 4,105,241 dated August 18, 1978. While grapple fixtures and end effectors of these types are very effective in grappling the grapple fixture and rigidizing the end effector with respect to the grapple fixture, they are not designed to permit heavy loads to be transferred across the interface between the end effector and the grapple fixture. The cable system of the snare of the grapple device is not well suited to high load applications.

A self-relocating manipulator assembly is disclosed in U.S. Pat. No. 4,585,388 dated April 29, 1986. In this device, end effectors are located at opposite ends of an arm assembly. The manipulator assembly is capable of selectively employing either of the two end effectors to provide a shoulder connection while the other is used as a grappling device. Again, the end effectors are constructed substantially in accordance with U.S. Pat. No. 4,105,241. Consequently, the limitations of the end effector of U.S. Pat. No. 4,105,241 apply when the end effector is used to provide the shoulder joint. Generally, the loads applied at the shoulder joint will be greater than those required at the other end for the purposes of grappling or capturing a free-flying satellite.

In the construction, servicing and operation of a space station, the need for a Mobile Servicing Center (MSC) has been recognized and it has been proposed that such a system should incorporate a relocatable Space Station Remote Manipulator System (SSRMS). In order to provide an effective SSRMS, the applicants have developed an end effector suitable for use with a Space Station Remote Manipulator System where capture and release capabilities are required, and which will provide for the transfer of substantial loads together with electrical power and signals across the end effector grapple fixture interface.

The applicants have developed a grapple fixture for use with an end effector having a latching mechanism which permits the transfer of substantial loads across an end effector/grapple fixture interface.

The grapple fixture of the present invention may be used in a space-station environment.

The functions associated with grapple fixtures used with known nonlatching end effectors, namely, its snaring and rigidizing capabilities, are maintained and can be operated independently of the new latching capability.

The grapple fixture of the present invention is capable of use in a space station assembly, payload handling functions, capturing free-flyers, assisting in payload servicing, and providing a stable base for an EVA work-station and a Manned Foot-Restraint. The grapple fixture is also useful in providing a stable base for other robotic and dexterous devices.

In particular, the grapple fixture may be located on a mobile servicing center, a maintenance depot or any other space station installation.

The grapple fixture is also able to support the space station remote manipulator system.

To function as a shoulder base unit, the grapple fixture has high strength and is capable of providing an extended operation life for an arm acting as a cantilever when serving a payload handling, free-flyer capturing and an EVA work-station support system. The grapple fixture provides a high degree of stiffness in order not to degrade arm control ability under difficult handling conditions. It is highly reliable when being engaged, held and disengaged from a shoulder end effector. The grapple fixture has provision for power and signal transmission from the power data grapple fixture to the space station remote manipulator system and vice-versa.

To permit the grapple fixture to function at the wrist end of the Space Station Remote Manipulator System, it has adequate strength and stiffness and the ability to be captured by free-flyers. It also has the ability to utilize the strength, stiffness and power and data transfer capability of the shoulder base system. It will also allow for or participate in the force moment accommodation mode of the Space Station Remote Manipulator System operation.

A further important feature of the grapple fixture of the present invention is useful in all the currently available capabilities of the existing shuttle remote manipulator system.

The internal envelope in the end effector for use with the grapple fixture is similar to that of the existing Shuttle Remote Manipulator System End Effector. The external envelope is somewhat larger than that of the existing end effector; however, this is more than compensated for by the greatly enhanced strength and stiffness characteristics derived from the addition of latching mechanisms which latch on to trunnions on the grapple fixture.

According to the present invention there is provided a grapple fixture comprising;

(a) a base comprising a mounting flange with an outwardly extending cylindrical body having an outer, annular, end effector abutment face, (b) an end effector latching trunnion attached to, and extending radially in a lateral direction from, the cylindrical body, (c) a substantially cone-shaped, grapple fixture aligning body extending outwardly from the cylindrical body, the cone-shaped body having a cylindrical, end effector locating, base portion attached to the abutment face, and (d) a laterally extending, grapple fixture recess engaging, rounded shoulder extending around a portion of the cylindrical base and secured against relative movement to the abutment face.

The latching trunnion may be one of a plurality of latching trunnions attached to, and extending radially in a lateral direction from, the cylindrical body at circumferentially spaced intervals therearound.

The laterally extending, grapple fixture recess engaging, rounded shoulder may be one of a plurality of laterally extending, grapple fixture recess engaging, rounded shoulders extending around circumferentially spaced portions of the cylindrical base and secured against relative movement to the abutment face.

The cone-shaped body may have a truncated apex, and a grapple probe with an enlarged head portion may be provided extending outwardly from the truncated apex.

The trunnion may have a rounded, end effector engaging surface.

The rounded shoulder may be spherical.

In the accompanying drawings which illustrate, by way of example, an embodiment of the present invention;

Figure 2:
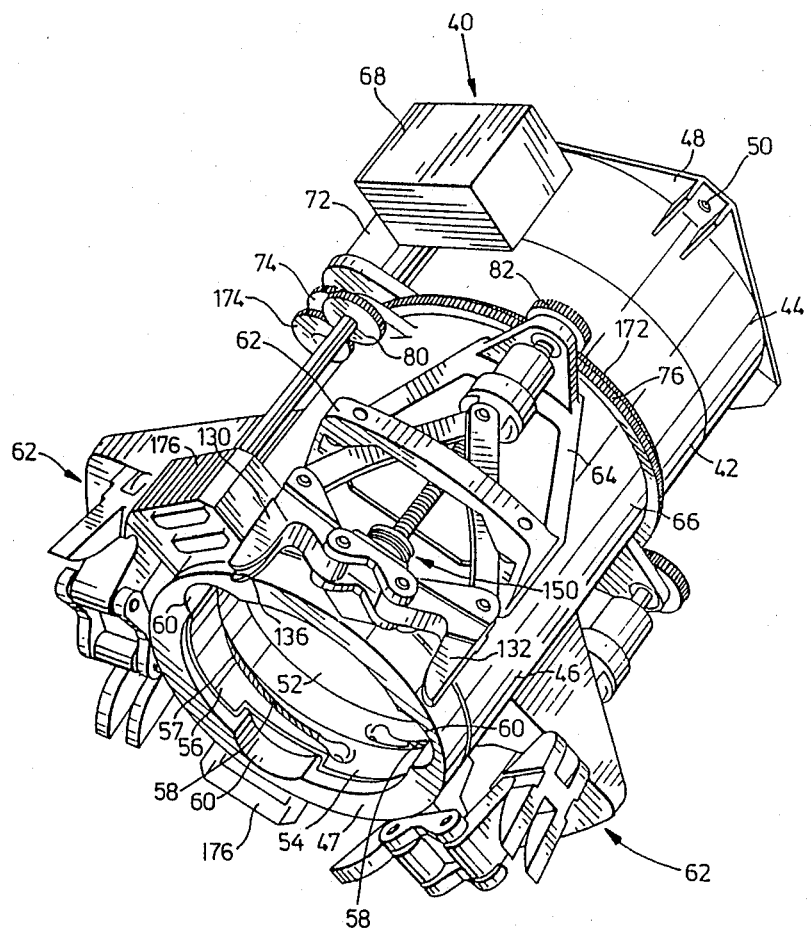
FIG. 2 is a perspective view of an end effector.
Figure 20:
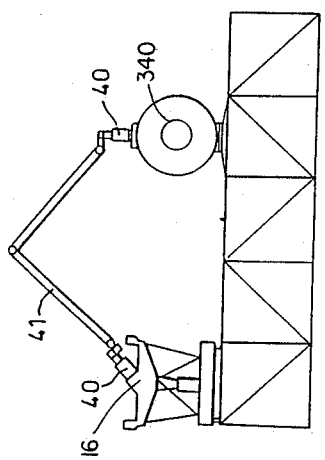
Figure 3:
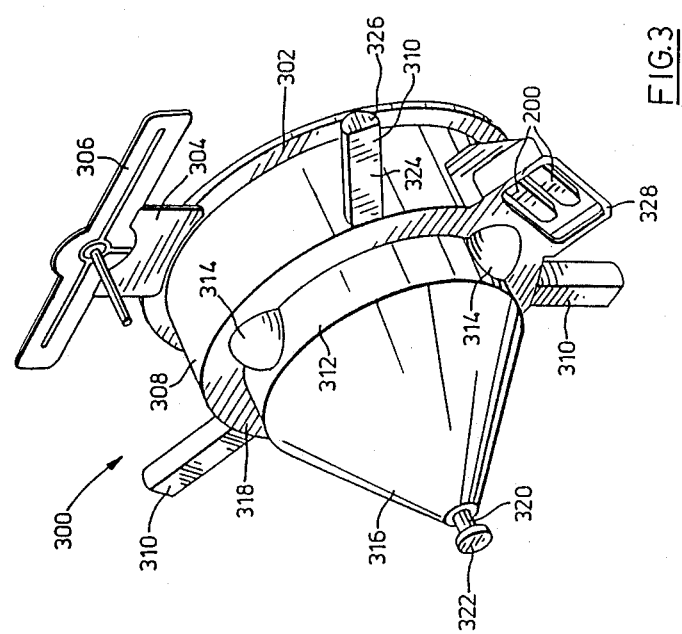
Figure 4:
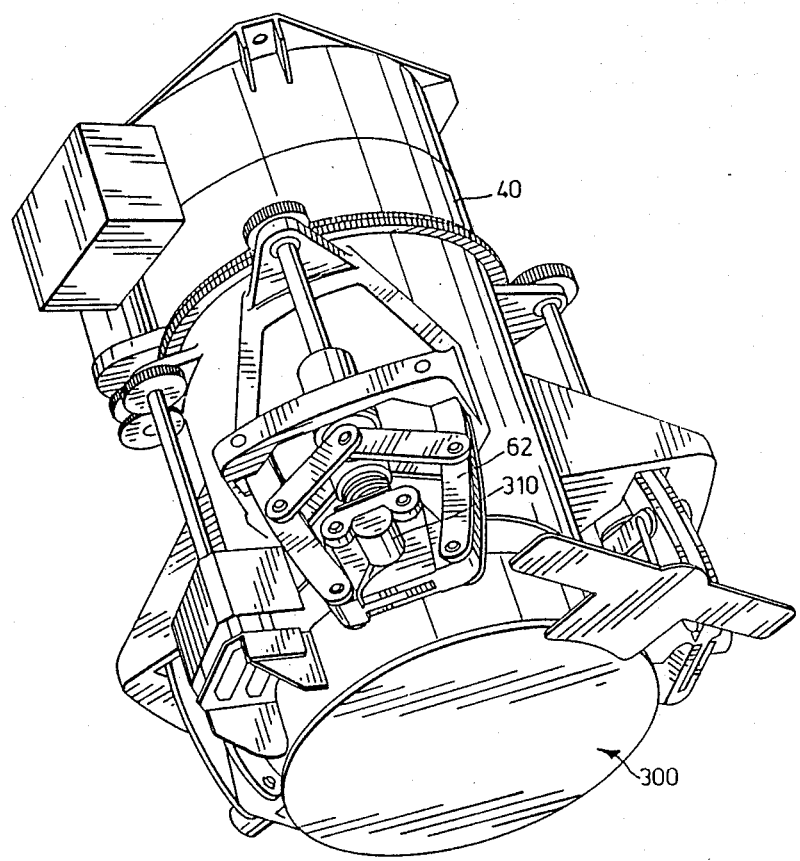
Figure 5:
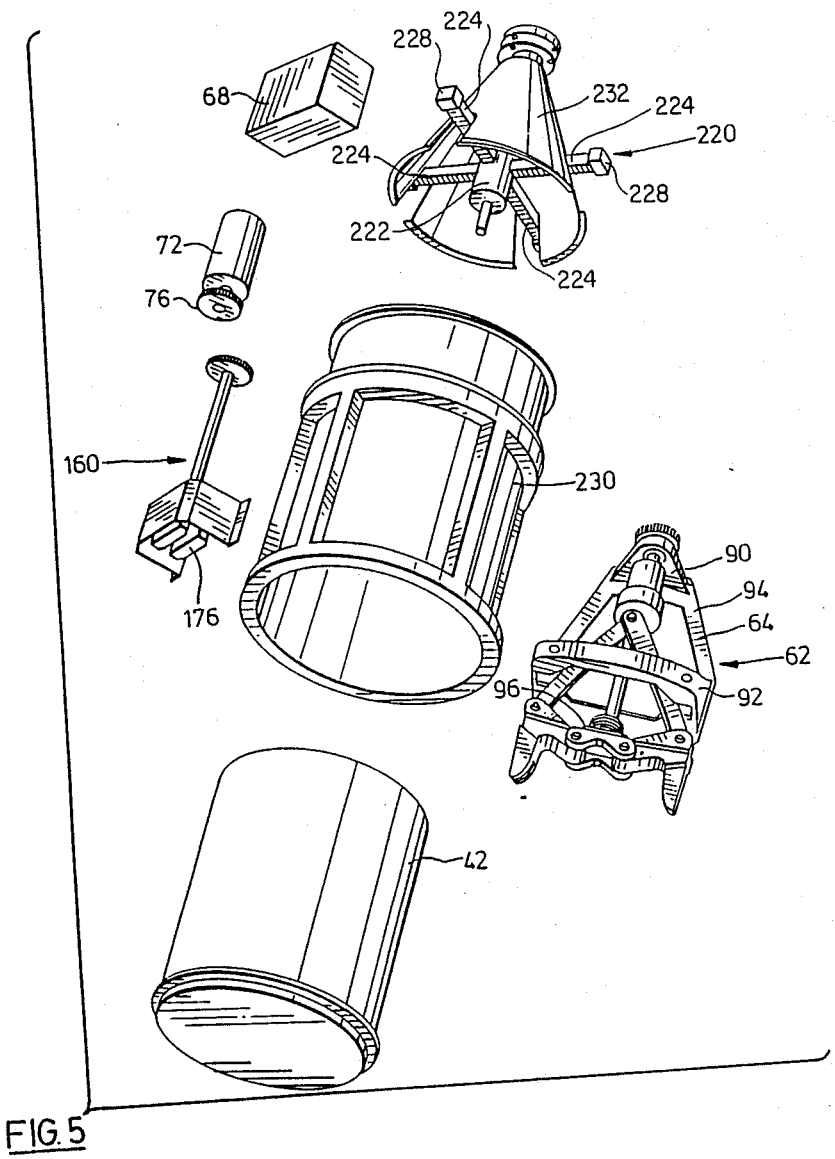
Figure 6:
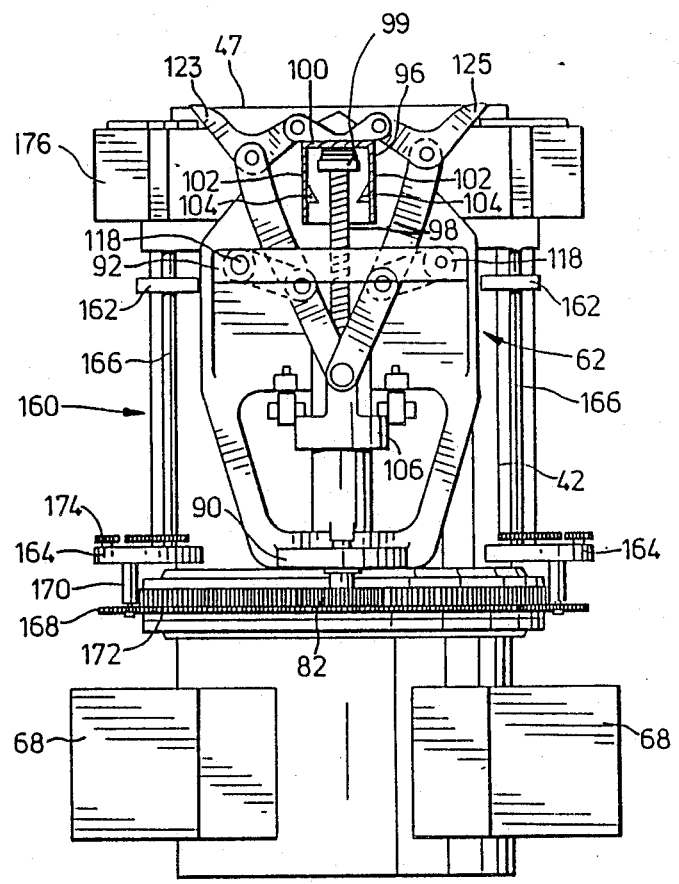
Figure 7:
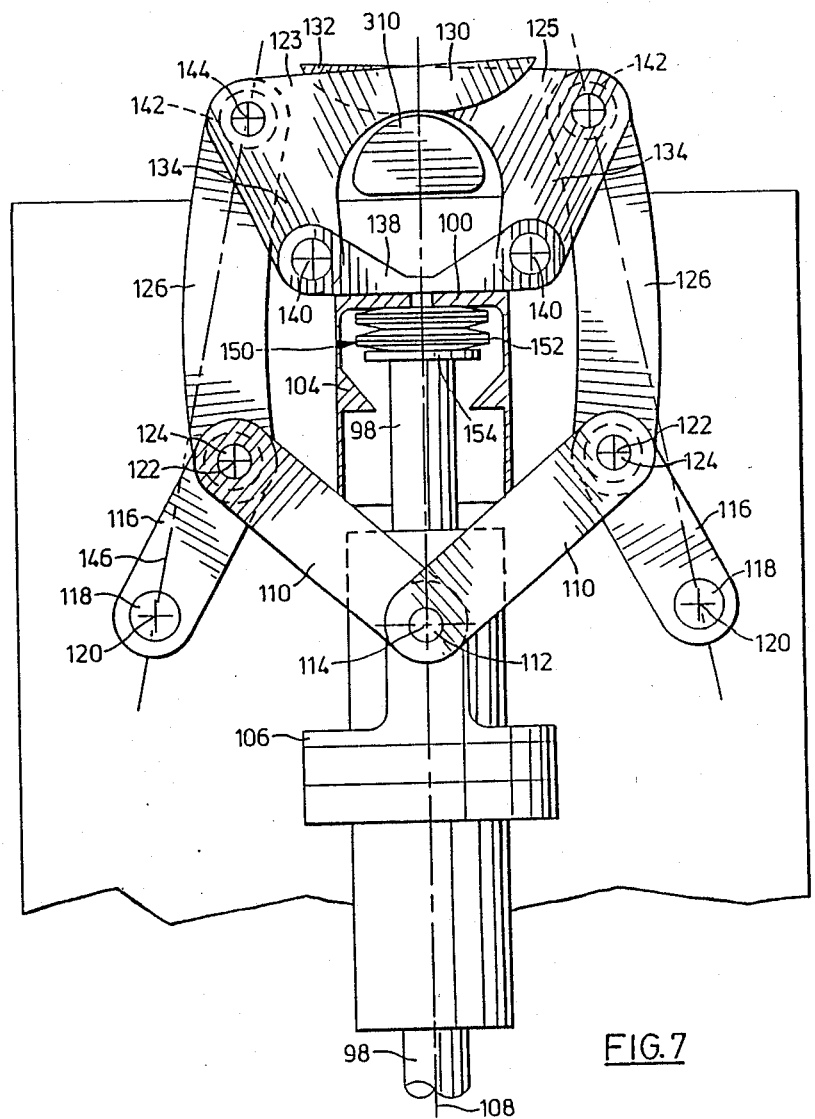
Figure 8:
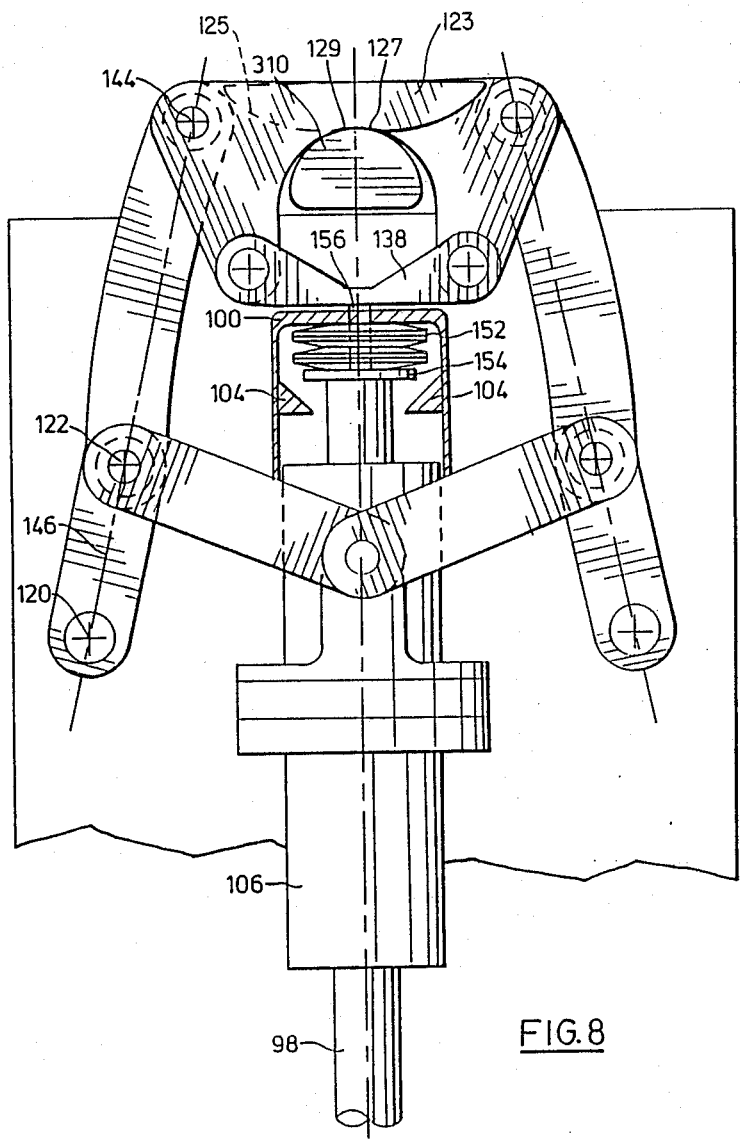
Figure 9:
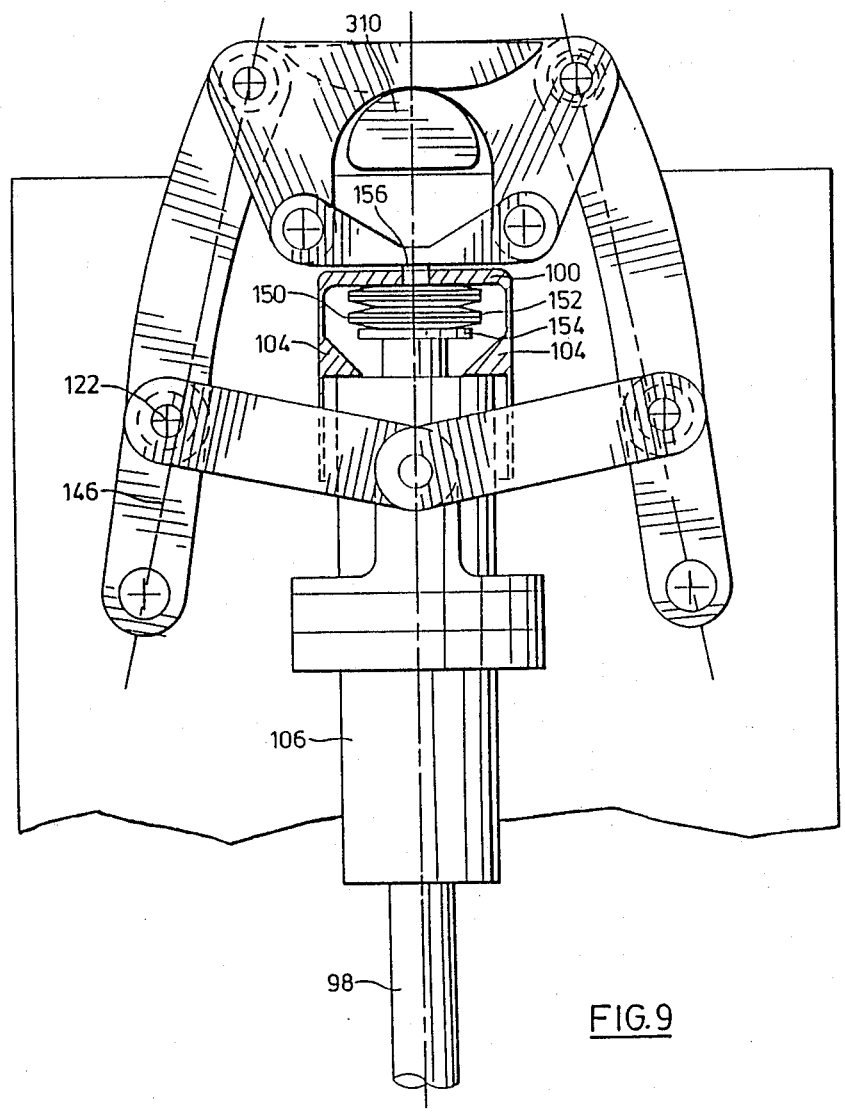
Figure 11:
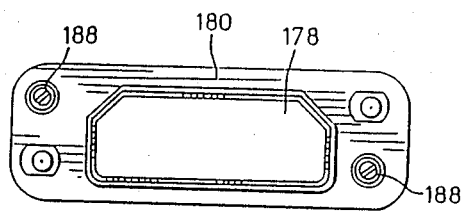
Figure 10:
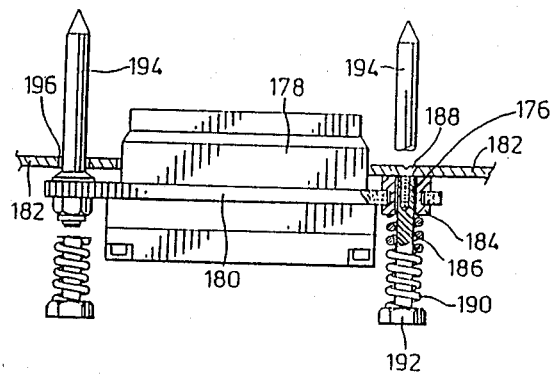
Figure 13:
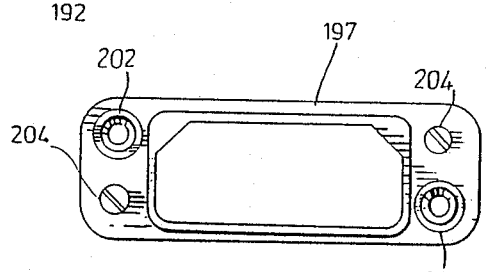
Figure 12:
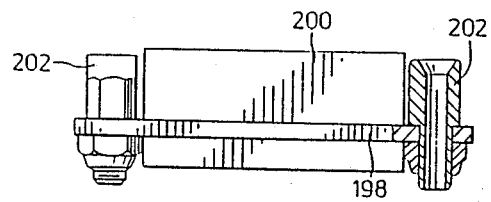
Figure 14:
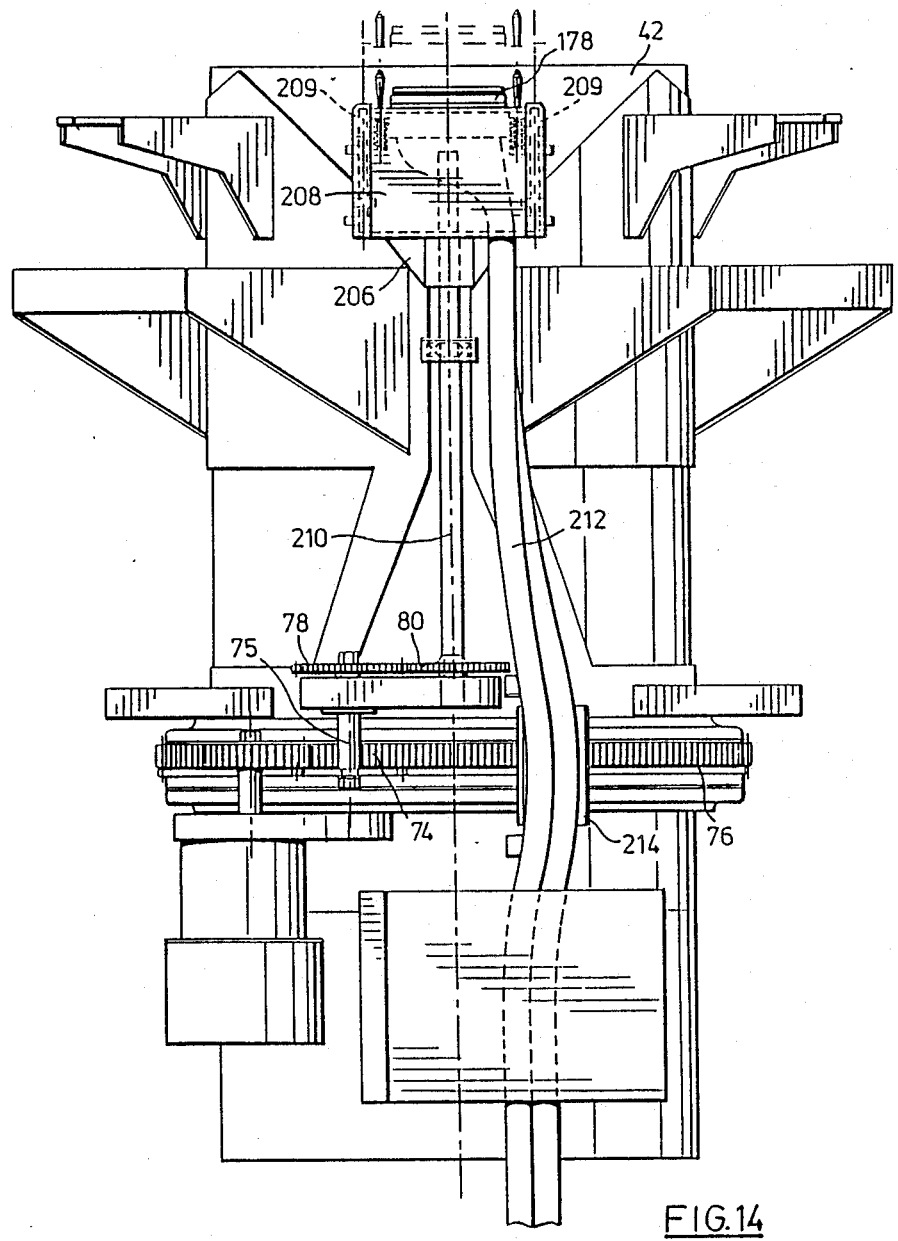
Figure 15:
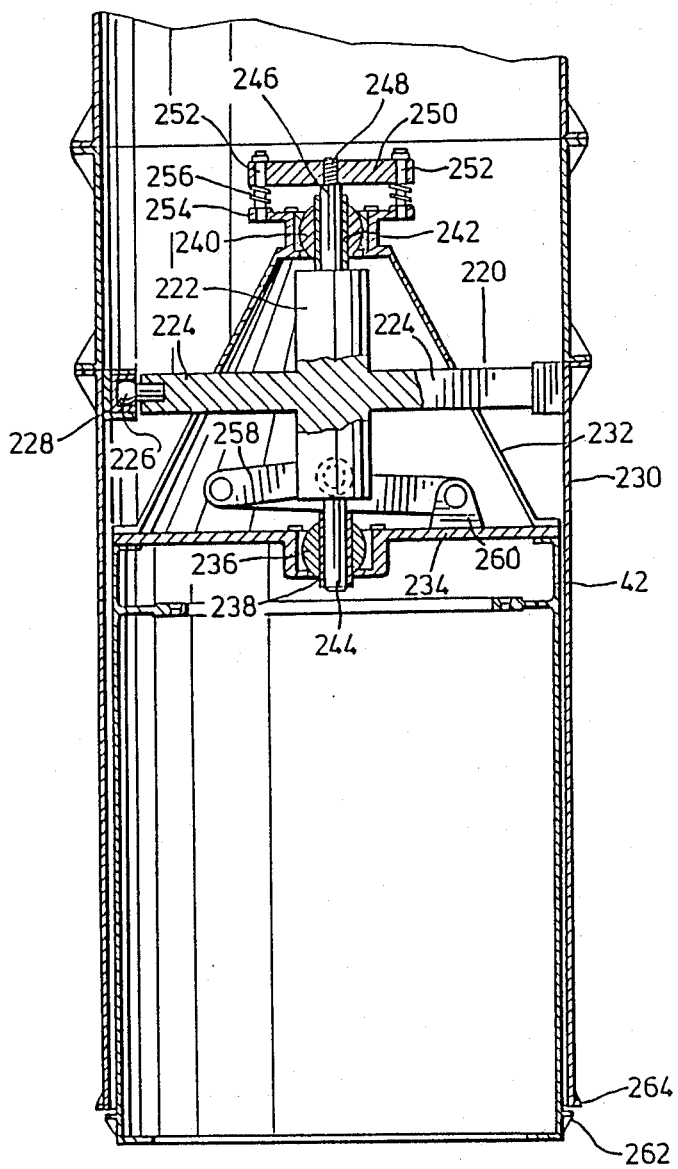
Figure 16:
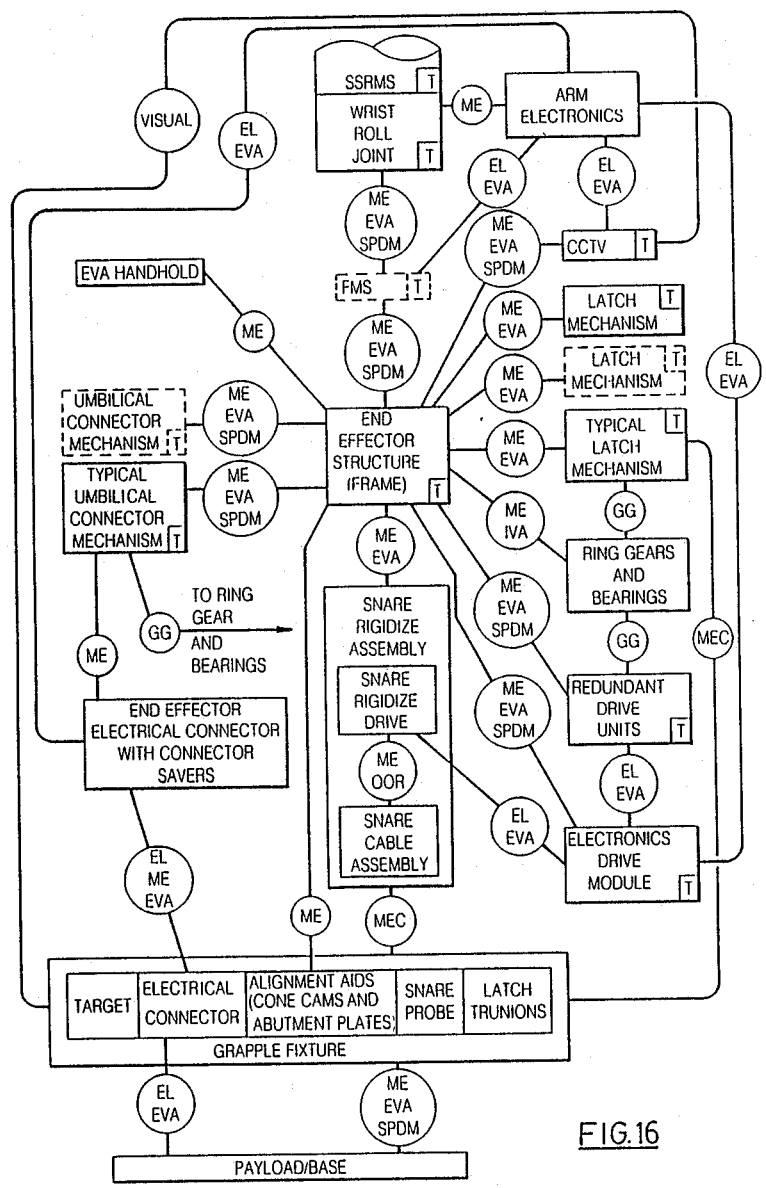
Figure 18:
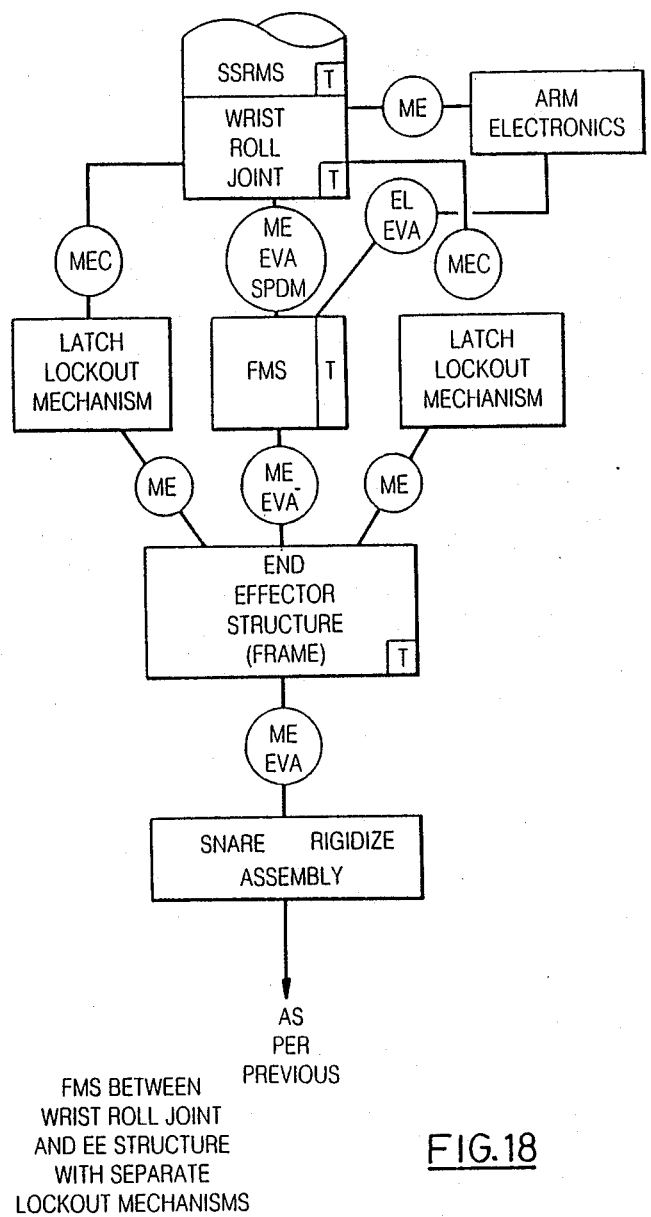
Figure 19:
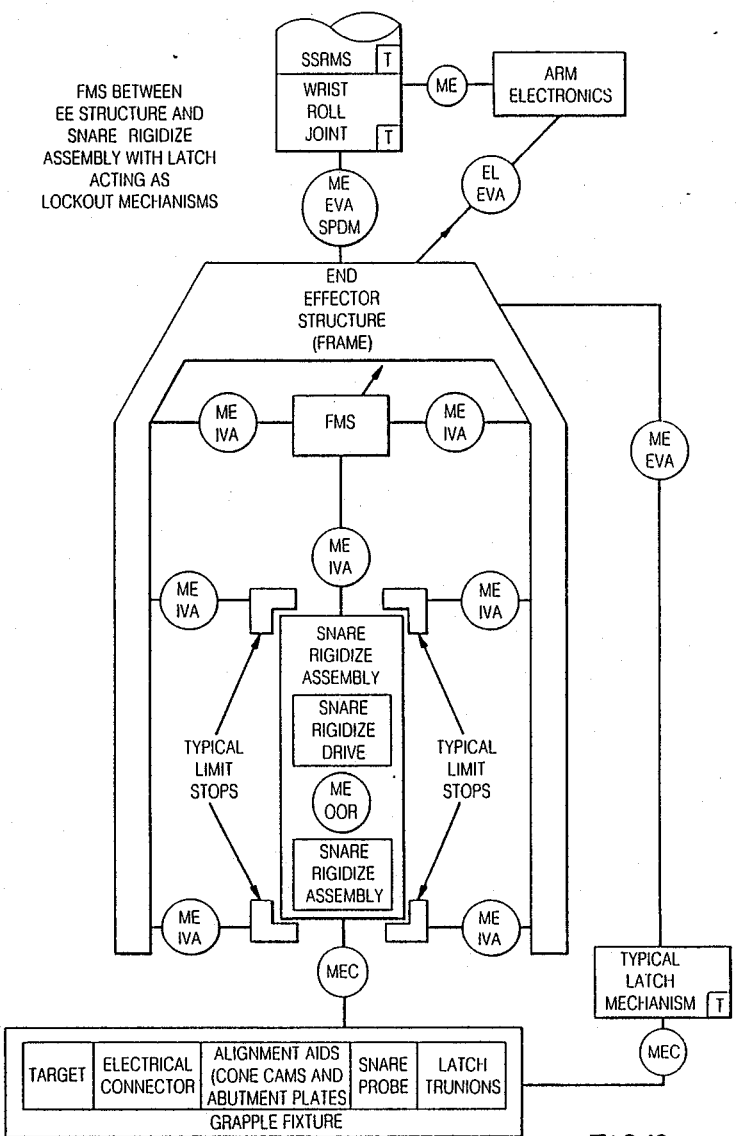
Figure 21:
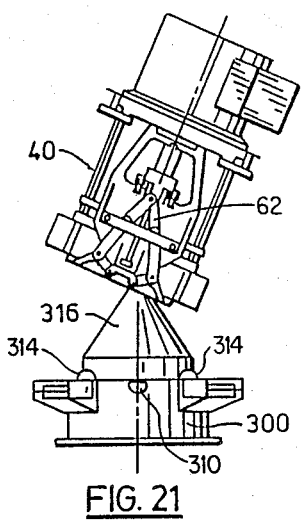
Figure 22:
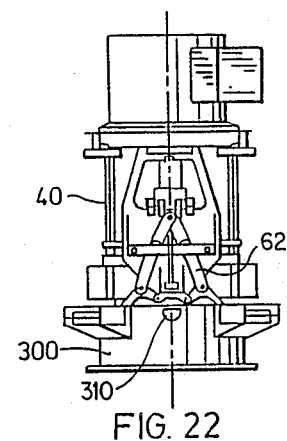
Figure 23:
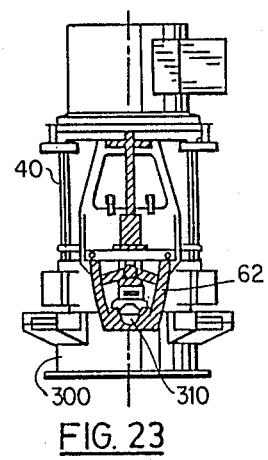
Figure 24:
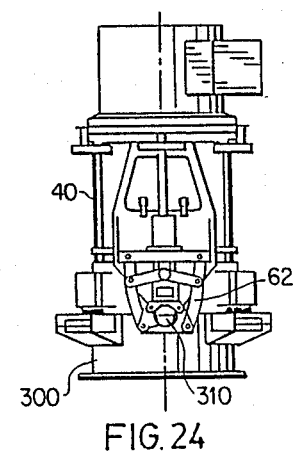

FIG. 3 is a perspective view of a grapple fixture for use with the end effector shown in FIG. 2, FIG. 4 is a perspective view of the end effector of FIG. 2 connected to the grapple fixture of FIG. 3, FIG. 5 is an exploded view of the end effector, FIG. 6 is a side view of the end effector showing the latch mechanism in a fully opened configuration, FIG. 7 is an enlarged, detailed side view of the latch mechanism when located in its initial latching position, FIG. 8 is a view similar to FIG. 7, showing the latching mechanism in an intermediate latching position, FIG. 9 is a view similar to FIG. 8 showing the latching mechanism in an over center position in which it prevents back driving of a ballnut, FIG. 10 is a partially sectioned side view of an end effector connector, FIG. 11 is a plan view of the end effector connector of FIG. 10, FIG. 12 is a partially sectioned side view of a grapple fixture connector, FIG. 13 is a plan view of the grapple fixture connector of FIG. 12, FIG. 14 is a side view of the grapple fixture with the latch mechanisms removed to reveal the umbilical cord connector and its drive mechanism, FIG. 15 is a partially sectioned side view of an end effector which employs a force moment center, FIG. 16 is a functional and interface diagram, FIG. 17 is a legend for the end effector and grapple fixture interface architecture, FIG. 18 is a functional diagram showing the force moment sensor located between a wrist roll joint and the end effector structure with separate lock-out mechanism, FIG. 19 is a functional diagram showing the force moment sensor between the end effector and a snare rigidize assembly with the latch acting as a lock-out mechanism, FIG. 20, which is on the same sheet as that containing FIG. 3, is a diagrammatic side view showing the space station remote manipulator system used in conjunction with a stationary payload, FIG. 21 is a side view of the end effector and grapple fixture showing the relative position of the end effector and grapple fixture during a typical approach to a grapple fixture, FIG. 22 is a view similar to FIG. 21 showing the alignment with the grapple fixture achieved with the aid of the force moment sensor which is incorporated in the end effector, FIG. 23 is a view similar to FIG. 22 showing the position assumed by the latch mechanism when the end effector is latched to the grapple fixture, and FIG. 24 is a view similar to FIG. 23 showing the positions assumed by the umbilical connectors when operational.

Figure 1:
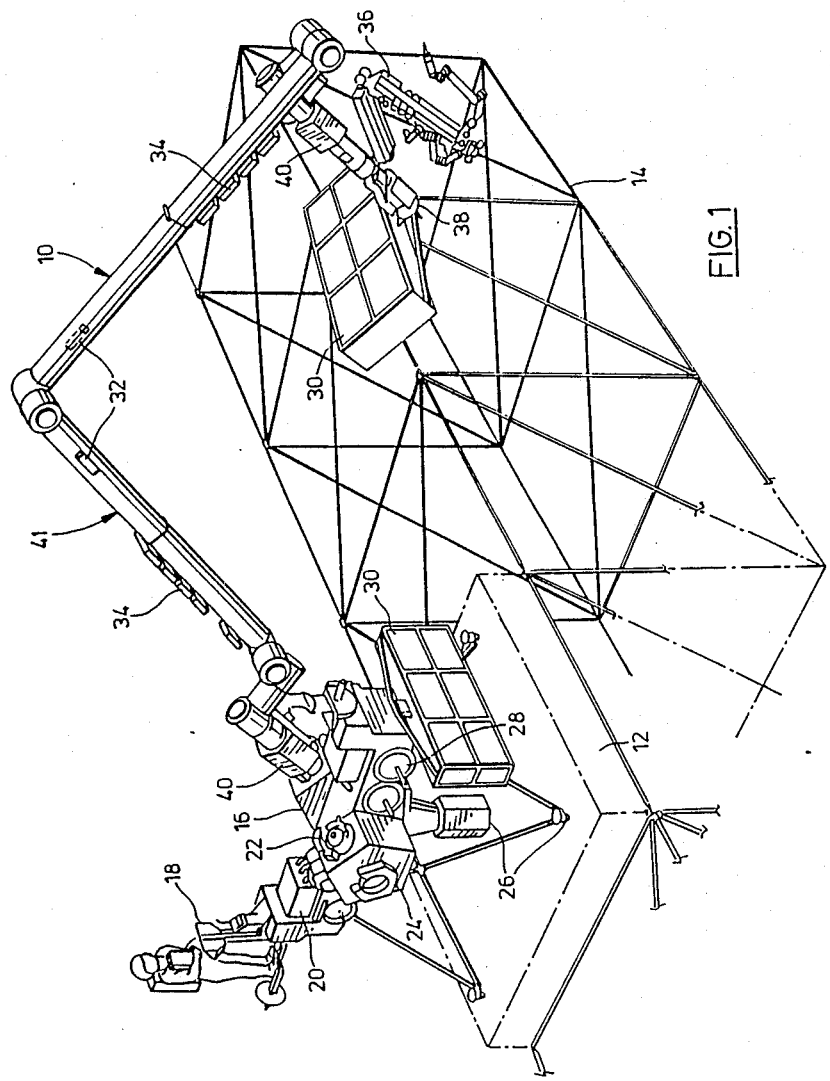
FIG. 1 is a perspective view of a Space Station Remote Manipulator System.

With reference to FIG. 1 of the drawings, the reference numeral 10 generally designates a Space Station Remote Manipulator System (SSRMS). The Space Station Remote Manipulator System 10 is used in conjunction with a mobile transporter 12, shown chain dotted, which can transport the Space Station Remote Manipulator System 10 relative to the structure of the space station generally designated 14. A mobile servicing center base structure is generally designated 16. The SSRMS 10 can be controlled from an extra vehicular activity work-station 18. The system includes a power management distribution system 20, power data grapple fixture 22, payload accommodation 24, mobile transporter interface 26 and data management system 28. Battery packs 30 are also provided. Closed circuit television cameras 32 are mounted on the arms of the SSRMS 10 as are arm electronics packs 34. A special purpose dexterous manipulator 36 and a universal service tool 38 are also provided.

An end effector 40, which may be used with grapple fixture 22 in accordance with the present invention, is mounted at each end of the arm assembly 41.

The end effector 40 is more clearly illustrated in FIG. 2 of the drawings to which reference is now made.

The end effector 40 incorporates a snare mechanism similar to that of the end effector described in U.S. Pat. No. 4,105,241 and so a detailed description of the snare mechanism is not necessary. The end effector 40 is basically capable of snaring and aligning the grapple fixture 22 in a similar manner to that described in the U.S. Pat. No. 4,105,241. As will be described later, the end effector may also incorporate a force moment sensor which can be used to achieve alignment of the end effector 40 and grapple fixture 22 without the aid of a grapple mechanism. As shown in FIG. 2, the end effector 40 includes a cylindrically-shaped grapple housing 42 which has a proximal end 44 and a distal end 46. A mounting flange 48 projects radially outwardly at the proximal end 44 and is formed with mounting poles 50 which are used to connect the housing 42 to the arm of a remote manipulator (not shown). The grapple housing 42 is formed with a grapple chamber 52 therein and a grapple passage 54 opens from the grapple chamber 52 through the distal end face 47 of the housing. As shown in FIG. 2, the grapple mechanism, which is generally designated by reference numeral 56, includes three snare cables two of which are shown and designated 58. As previously indicated, this grapple mechanism is similar to that described in U.S. Pat. No. 4,105,241 and will not therefore be described in detail. Three circumferentially spaced arcuate-shaped pockets 60 are formed at the distal end of the housing 42.

FIG. 3 shows a grapple fixture in accordance with the present invention, generally designated 300, which, as will be described later, may have a probe 320 snared by the snare cables 58, trunnions 310 gripped by the latches 62 to draw the grapple fixture in to the housing 42 until, as shown in FIG. 4, locating shoulders 314 on the grapple fixture 300 are located in the pockets 60 and end face 318 is in contact with end face 47.

In FIGS. 2 and 4, three latch assemblies 62 are provided. Each latch assembly 62 comprises a support structure in the form of a frame 64 which is removably mounted on the outer face 66 of the grapple housing 42. The latch assemblies 62 are circumferentially spaced around the outer face 66. An electronic module 68 is also mounted on the outer face 66 of the grapple housing 42. The electronic module 68 is provided for controlling the operation of the latches 62 and an umbilical connector mechanism which will be described later.

In FIG. 2, two electrical connector assemblies 176 are mounted on the outer face 66 of the grapple housing 42 at circumferentially spaced intervals therearound. A motor module 72 is also releaseably mounted on the outer face 66 of the grapple housing 42. Ring gears 76 and 172 are mounted on the grapple housing 42 and extend circumferentially around the outer face 66 thereof. The ring gears 76 and 172 are each connected to power output pinions (not shown) which are mounted on the power output shaft of the motor 72. The power output pinions are each provided with a clutch which can be operated selectively to cause either of the power output pinions to be driven to drive the ring gear with which it is meshed so that either one of the ring gears 76 or 172 may be driven.

Each of the latch assemblies 62 has a latch pinion 82 which meshes with the ring gear 76, which is an umbilical ring gear, such that the latch assemblies 62 are actuated simultaneously by the motor module 72. It will be understood that because this mechanism is to be used with the space station 14 (FIG. 1), a second motor module assembly (not shown) is provided in close proximity to the second electrical connector such that in the event of failure of one motor module, the other may be activated.

As shown in FIG. 5, each latch assembly 62 comprises a support frame 64 formed with a flange 90 and a bridge member 92 which projects from one side of a base 94. As shown in FIG. 6, a bracket 96 also projects from a distal end of the base 94. The bracket 96 includes a platform 100 and a pair of bracing flanges 102, each of which is formed with a lug 104 which projects laterally inwardly to provide a stop for limiting the travel of a ballscrew nut 106 as will be described hereinafter.

The latch assemblies 62 are modular so as to be easily removed from the grapple housing 42.

In FIG. 6, which shows the position of the grapple housing 42 when each latch assembly 62 is in the opened position, the latch assembly is shown comprising a ball screw shaft 98 which has one end supported for rotation in a bearing (not shown) mounted in the flange 90. The distal end of the ball screw shaft 98 is mounted in a bearing 99 which is supported on the underside of the platform 100.

Referring once again to FIGS. 5 and 6, an umbilical connector mechanism is generally designated by the reference numeral 160. As will be described later, the umbilical connector mechanism 160 in operation connects an umbilical cord, carried by an end effector, across an interface formed between that end effector and the grapple housing 42. As shown in FIG. 6, pairs of flanges 162 and 164 project laterally from opposite sides of the grapple housing 42 and a pair of shafts 166 are mounted for rotation in the flanges 162 and 164. A pinion 168 is mounted on each shaft 170 which is supported by the corresponding flange 164. Each pinion 168 is meshed with the ring gear 172 which is mounted for rotation on the grapple housing 42. A gear train 74, 174 and 80 serves to connect the drive shaft 170 to the shaft 166 such that when the ring gear 172 is rotatably driven, the shaft 166 will be rotatably driven. Rotation of the drive shaft 166 will cause the connector member 176 which is mounted thereon to move, as will be described later, toward and away from an interface to mate with a complimentary connector element carried by the grapple fixture 22 as will be described hereinafter.

As shown in FIG. 7, the ballscrew nut 106 is threadedly mounted on the ballscrew 98 such that rotation of the ballscrew 98 about its longitudinal axis 108 causes the ballscrew nut 106 to move along the axis 108.

Latching levers and their associated toggle mechanism are best illustrated in FIGS. 7, 8 and 9 read in conjunction with FIG. 6. As shown in FIG. 7, the toggle mechanism includes a pair of first link arms 110 which have their proximal ends pivotally mounted on a pivot pin 112 for rotation about a first axis 14. The pivot pin 112 is mounted on the ballscrew nut 106. A pair of second link arms 116 each have their proximal ends pivotally mounted on pivot pins 118 which are supported by the bridge 92 of the frame as shown in FIG. 6. The second link arms 116 are free to pivot about second axes 120. The distal ends of the first and second link arms 110 and 116 are pivotally connected for movement about third axes 122 by means of pivot pins 124. A pair of third link arms 126 each have their proximal ends pivotally connected to a pivot pin 124 for movement about the axes 122.

The latching assembly also includes bell-crank latching jaws 123 and 125. The latching jaws 123 and 125 have latch arm portions 130 and 132 respectively and lever arm portions 134. As shown in FIG. 2 of the drawings, the latch arm 132 is a single arm and the latch arm 130 is bifurcated to provide a notch 136 which will receive the single arm 132.

A bridging link 138 (FIGS. 7 and 8) is pivotally connected to the proximal ends of the lever arms 34 of the latching jaws 123, 125 for movement about fourth axes 140.

The elbows 142 of the latching jaws 123, 125 are pivotally connected to the distal end of each third link arm 126 for movement about fifth axes 144. Because both ends of each third link arm 126 are pivotally mounted, allowance is made for the latching jaws 123, 125 and the bridging link 138 to conform to deflections of grapple fixture trunnions which will be described later.

By rotatably driving the ballscrew 98, the ballscrew nut 106 can be driven to and fro between its fully retracted position illustrated in FIG. 2 of the drawings and its extended position shown in FIG. 9 of the drawings.

FIG. 7 of the drawings shows the position which the latching jaws 123, 125 will assume after capture of a grapple fixture trunnion 310. When in this position, it will be noted that the third axes 122 are located inwardly of their center lines 146 which intersect the associated second axis 120 and fifth axis 144. Further movement of the ballscrew 98 toward the fully extended position will cause the axis 122 to approach and eventually become aligned with the center line 146 as shown in FIG. 8. Thereafter, further movement of the ballscrew 98 toward its fully extended position will cause the axis 122 to be displaced laterally outwardly from the center line 146. This is the position which the linkage assembly will assume when the ballscrew nut 106 is in its fully extended position bearing against the lugs 104 as shown in FIG. 9. In this configuration, the linkage mechanism is located in an overcenter condition which will not permit back driving of the ballscrew 98 because the application of a load tending to open the latching jaws 127, 129 will be applied to the ballscrew nut 106 through the linkage so that it will tend to urge the ballscrew nut 106 toward the arresting lugs 104 and not away from the lugs 104.

In order to eliminate backlash in the linkage assembly, a compression spring assembly 150 is provided. The compression spring assembly 150 consists of a stack of Bellville washers 152 which are compressed between a support plate 154 and the underside of the platform 100. A shaft 156 (FIG. 8) has one end connected to the support plate 154 and its other end connected to the bridging link 138. The shaft 156 extends through the Bellville washers 152 such that when the bridging link 138 is raised from the platform 100, the Bellville washers 152 will be further compressed between the platform 100 and the support plate 154. Although only one set of Bellville washers is illustrated in the drawings, it will be understood that two sets are actually provided with one set being located behind the ballscrew shaft 98 in relation to the view illustrated in FIG. 7. This serves to ensure that the bridging link 138 will not be subjected to twisting loads when it is raised above the platform 100.

In use, the Bellville washers 152 are precompressed when the bridging link 138 is resting on the platform 100 as shown in FIG. 7. The trunnion 310 cannot be moved relative to the end effector 40 (FIG. 1) after it has been captured and assumes the position shown in FIG. 7, because the linkage mechanism must yield in order to permit the latching jaws 123, 125 to move from the position shown in FIG. 7 to the over-center position shown in FIG. 9. The yielding of the linkage assembly is achieved by reason of the fact that the Bellville washers 152 can be compressed to permit the bridge link 138 to be elevated. By reason of the fact that the latch assembly linkage is capable of yielding, it is possible to contour the inner faces 127 and 129 of the latching jaws 123, 125 respectively so that they have a concave arc of curvature which serves to center and retain the trunnion 310. The compression of the springs to provide a load ensures that the grapple fixture end effector interface will remain in a highly loaded condition to form a stiff connection that is free of any play.

As shown in FIG. 6 of the drawings, when the latching jaws 123 and 125 are in the fully opened position, a major portion of their length is spaced rearwardly from the end face 47 of the housing 42 so that it does not obstruct access to the grapple passage 54 (FIG. 1).

In use, by rotatably driving the ring gear 172 in a first direction, the latching jaws 123, 125 can be moved from their fully opened position illustrated in FIG. 6 to their fully closed position illustrated in FIG. 9 and by rotatably driving the ring gear 172 in the opposite direction, the latching jaws can be opened from the closed position.

The connector member 176 is illustrated in FIGS. 10 and 11 of the drawings. As shown in FIG. 10, the connector 176 consists of a connector plug member 178 which is mounted on a support plate 180. The support plate 180 in turn is mounted on the face plate 182 of the carrier assembly which is reciprocally driven by the umbilical drive mechanism by way of its rotatable drive shaft. The support plate 180 has a pair of sleeve bearings 184 mounted therein through which shafts 186 extend. The shafts 186 are secured to the face plate 182 by mounting screws 188. A compression spring 190 is located between the head portion 192 of the shaft 186 and the sleeve 184 so as to normally urge the support plate 180 and its plug member 178 toward the face plate 182. As shown in FIG. 11, the mounting screws 188 and their associated shafts 186 are located at diagonally opposite corners of the support plate 180. Guide pins 194 are located at the opposite corners of the support plate 180 and project forwardly therefrom through passages 196 formed in the face plate 182.

The complementary connector 197 carried by a grapple fixture is shown in detail in FIGS. 12 and 13. The complementary connector 197 consists of a support plate 198 which supports a socket member 200 which is adapted to mate with the plug member 178 (FIGS. 10 and 11) in order to form a connection therewith. Guide sockets 202 are mounted on the support plate 198 and are arranged to receive the guide pins 194 to align the plug member 178 with the socket member 200. Mounting screws 204 are provided for the purposes of mounting the support plate 198 with respect to a grapple fixture 22.

Turning now to FIG. 14 of the drawings, it will be seen that the umbilical connector mechanism includes a ballscrew nut 206 which is connected to the connector housing 208 and is threadedly mounted on a ballscrew 210. The ballscrew 210 is rotatably driven through the power train pinions 78 and 80. The pinion 74 is connected to the pinion 78 through the shaft 75 so that when the umbilical cord ring gear 76 of FIG. 2 is rotatably driven, the ballscrew shaft 210 will be rotatably driven and this in turn will cause the ballscrew nut 206 to be driven longitudinally to move the connector housing 208 between the position shown in solid lines in FIG. 14 and the position shown in dashed lines. The umbilical cord 212 is connected to the plug member 178 for movement therewith. A bridge 214 is provided for guiding the umbilical cord 212 over the gear rings. The connector housing 208 is slidably mounted on guide rails 209 for longitudinal movement with respect to the grapple housing 42.

FIGS. 5 and 15 show a force moment sensor, generally designated 220, which is provided to facilitate the initial alignment of the end effector with respect to the grapple fixture 22 and to monitor the light loads transmitted through the grapple fixture 22 when the latch assemblies 62 are disengaged. The force moment sensor 220 consists of a central shaft 222 which has four arms 224 projecting radially therefrom. The outer ends of the arms 224 are each fitted with spherical end portions, such as that shown and designated 226 in FIG. 15, which are seated pivotally in receptacles 228. Strain gauges (not shown) are mounted on the arms 224 to function as sensors. The receptacles 228 are secured with respect to a cylindrical latch mounting enclosure 230 (FIG. 15). The spherical end portions 226 serve to prevent transmission of some of the forces which are sensed by the force moment sensor 220 to the enclosure 230. These forces could otherwise cause an incorrect reading to be generated by the force moment sensor 220. It will be understood that the spherical end pieces could be replaced by "flexures" which can provide more accurate force moment sensor readings. A conical-shaped housing 232 is secured to a force moment sensor base plate 234 which in turn is secured to the proximal end 44 of the grapple housing 42. A spherical bearing 236 is mounted in the force moment sensor base plate 234 and a linear bearing 238 is mounted in the spherical bearing 236. Similarly, a spherical bearing 240 is mounted at the upper end of the conical housing 232 and a linear bearing 242 is mounted in the spherical bearing 240. The central shaft 222 has a lower end portion 244 of reduced diameter mounted in the linear bearing 238 and an upper end portion 246 of reduced diameter mounted in the linear bearing 242. The upper end portion 246 of the shaft has a threaded end portion 248 threadedly mounted in a bridge member 250. A pair of spaced parallel guide pins 252 are mounted in the end flange 254 which is located at the upper end of the conical-shaped housing 232. Compression springs 256 are compressed between the flange 254 and the bridge plate 252 to urge the bridge plate 252 away from the conical-shaped housing 232. A torsion linkage 258 connects the lower end of the central shaft 222 to a bracket 260 which is mounted on the force moment sensor base plate 234.

In use when a load is encountered which is in excess of that which the force moment sensor is designed to detect, the grapple housing 42 will move longitudinally with respect to the external latch mounting enclosure 230 by compressing the springs movement restricting means in the form of a flange 262, which is located at the proximal end of the grapple housing 42, comes in contact with the flange 264, which is located at the distal end of the external latch mounting enclosure 230, so that any further forces which are applied to the grapple housing 42 will be transmitted by the flanges 262 and 264 to the external latch mounting enclosure and so no additional load will be applied to the force moment sensor 220.

It will be understood that this telescoping of the grapple housing 42 with respect to the external latch mounting enclosure 230 will occur when the latching mechanism is activated and consequently, the force moment sensor will be locked out of the system when the latches are activated to latch the end effector 40 to the grapple fixture 22.

The end effector 40 may be used with the grapple fixture generally designated 300 in FIG. 3. The grapple fixture 300 may be used as the power data grapple fixture 22 illustrated in FIG. 1 or it may be attached as a grapple fixture to a payload or the like. The grapple fixture 300 has a base comprising a mounting flange or end plate 302, which may be used for the purposes of mounting it on the payload or the like and an outwardly extending cylindrical body 308. An arm 304 projects radially outwardly from the end plate 302 and has an alignment target 306 located thereon. The cylindrical body 308, projecting outwardly from the base plate 302, has an outer, annular, end effector abutment face 318 and latch trunnions 310 projecting radially from the cylindrical body 308. The trunnions 310 are equally spaced circumferentially and are alignable with the latching jaws 123, 125 (FIGS. 6 to 9) of the end effector 40. A substantially cone-shaped, grapple fixture aligning body 316 extends or projects outwardly from the cylindrical body 308. The cone-shaped body 316 has a cylindrical, end effector locating, base portion 312 attached to the abutment face 318. Three laterally extending, grapple fixture recess engaging, rounded shoulders 314 project radially from the cylindrical base 312 and are equally spaced circumferentially around the cylindrical base 312 and are secured against relative movement to the abutment face 318. The rounded shoulders 314 fit in a close fitting relationship within the recesses or pockets 60 of the end effector 40 (FIG. 2). The rounded shoulders 314 are rounded on the end effector engaging surfaces so as to be self-centering when entering the pockets 60. The cone-shaped body 316 has a truncated apex and a grapple probe 320 projects from the truncated apex and has an enlarged head portion 322 at the outer end thereof. The abutment end face 318 in use is arranged in an end to end relationship with the distal end face 47 of the end effector 40.

As shown clearly in FIG. 3 of the drawings, the trunnions 310 each have a generally flat outer face 324 and a rounded back face 326.

An electrical connector housing 328 (FIG. 3) is mounted on the cylindrical body 308 and projects radially outwardly therefrom. In FIG. 3, two socket members 200 (of the type shown in FIGS. 12 and 13) are mounted in the housing 308 for alignment with complementary plug members 178 mounted in the electrical connectors 70 FIGS. 2, 10, 11 and 14) of the end effector 40.

FIG. 4 of the drawings illustrates the latched position of the end effector 40 and grapple fixture 300. In this position, the latch assemblies 62 are in the closed position embracing the trunnions 310 and the umbilical connections are made.

FIG. 16 of the drawings is a functional and interface diagram, the legend of which is illustrated in FIG. 17 of the drawings. FIGS. 18 and 19 are diagrams illustrating the force moment sensor options to which the legend of FIG. 18 also applies.

In use, the end effector 40 may be mounted at one or both ends of a device such as the remote manipulator arm 42 and any number of grapple fixtures 300 may be mounted at locations accessible to the manipulator arm 42. Each of the grapple fixtures 300 which are intended to provide a shoulder connection for the remote manipulator arm will also be provided through their umbilical cord system with a source of power and/or with a control station. As a result, when the end effector is mated with the grapple fixture to form a shoulder connection, command signals can be transmitted through the interface between the end effector and the grapple fixture which will serve to control the movement of the remote manipulator arm. In addition, because it is possible to latch the end effector to the grapple fixture, substantial loads can be applied to the shoulder joint without damaging the shoulder joint.

The grapple fixture 300 can also be mounted on a free-flyer or a payload item which does not require power or command signals to be transmitted through the end effector grapple fixture interface. In such an application, it is not necessary to provide the socket members 200 in the grapple fixture 300.

FIGS. 1 and 20 to 24 illustrate the use of the end effector 40 and grapple fixture 300 in association with a stationary payload such as the space station 14 (FIG. 1). In this configuration, it is possible to utilize the force moment sensor 220 (FIGS. 5 and 15) of the end effector 40 to obtain alignment without using the snare or grapple mechanism. In use, the arm 41 (FIG. 20) is commanded to move the end effector 40 along its longitudinal axis. As the inside diameter of the end effector 40 contacts the outside of the cone-shaped body 316, the force moment sensor 220 generates a feedback signal which causes the arm 41 to move the end effector laterally to adjust its alignment with the cone-shaped body 316. Some angular improvement in alignment is also provided by the force moment sensor as the end effector pockets 60 (FIG. 2) contact the rounded shoulders 314 which protrude beyond the cone-shaped body 316. The angular alignments, however, may require some assistance from the arm operator who will use the closed circuit television cameras 32 (FIG. 1) mounted on the arm 41 such that its position is fixed for the end effector to view the alignment target on the grapple fixture. The operator assistance may be required to assist the force moment sensor to achieve angular alignment because of the complexity of angular alignments in three dimensions.

As shown in FIGS. 1 and 20 of the drawings, the end effectors 40 may be located at each end of the manipulator arm assembly 41 of a space station remote manipulator system 10 such that one end effector 40 is connected to the mobile service center 16 while the other is secured to a stationary payload item 340. If, however, the system is to be used to capture "free flyers", which do not offer the stability of a stationary payload, it is then necessary to use the snaring capability of the end effector. In this case the manipulator arm 41 is initially manipulated into a position such as that illustrated in FIG. 21 in which the probe 320 (FIG. 3) of the grapple fixture 300 extends into the grapple passage of the grapple housing 42; it is then possible for the snaring cables 58 (FIG. 2) to be activated so that they engage the probe. This snaring action will serve to further align the end effector 40 with the grapple fixture 300 and draw the two together. While the arm 41 is capable of being back driven by forces exerted during snaring and rigidizing without the use of the force moment sensor 220 (FIGS. 5 and 15), the use of the force moment sensor 220 may allow the arm to better respond to accommodate itself to free flying payloads by reacting faster and increasing the arm compliance. Conventional arms 41 are left in a limp mode during the snaring and rigidizing sequence for free flyers by lowering the current to the motors at the joints to a minimum value which allows the joints of the arms 41 to be back-driven while still offering some resistance to joint movement. If the force moment sensor 220 is used, contact between the end effector 40 and the cone-shaped body 316 will activate the force moment sensor 220 and cause it to generate a signal which can be interpreted by a control system to generate alignment correction commands to the various powered joints of the arm 41 so that the arm 41 will be manipulated to bring the end effector 40 more closely into alignment with the grapple fixture 300.

FIG. 22 of the drawings illustrates the relative positions of the end effector 40 and the grapple fixture 300 when aligned with one another and with the latches 62 open. The latches 62 are then closed around the trunnions 310 as shown in FIG. 23. The umbilical connector mechanism 160 (FIGS. 5 and 6) is then activated to cause the plug members 178 (FIGS. 10 and 11) to mate with their socket members 202 (FIGS. 12 and 13) as shown in FIG. 24.

Various modifications of the present invention will be apparent to those skilled in the art. It will, for example, be apparent that while three latching trunnions 310 are shown together with three latch assemblies 62, it may be possible in some circumstances to achieve the required connection using only one trunnion and one latch or in some cases using two trunnions 310 and two latches 62. The number of trunnions 310 and latches 62 which are used is not critical. Similarly, any number of electrical connectors may be provided. These and other modifications of the present invention will be apparent to those skilled in the art.

It will also be apparent that in some embodiments of the present invention, it may be possible in some circumstances to use only one rounded shoulder 314 extending around a portion of the cylindrical base 312.

We claim:

1. A grapple fixture, comprising;
    (a) a base comprising a mounting flange with an outwardly extending cylindrical body having an outer, annular, end effector abutment face,
    (b) an end effector latching trunnion attached to, and extending radially in a lateral direction from, the cylindrical body,
    (c) a substantially cone-shaped, grapple fixture aligning body extending outwardly from the cylindrical body, the cone-shaped body having a cylindrical, end effector locating, base portion attached to the abutment face, and
    (d) a laterally extending, grapple fixture recess engaging, rounded shoulder extending around a portion of the cylindrical base and secured against relative movement to the abutment face.

2. A grapple fixture according to claim 1, wherein the latching trunnion is one of a plurality of latching trunnions attached to, and extending radially in a lateral direction from, the cylindrical body at circumferentially spaced intervals therearound.

3. A grapple fixture according to claim 1, wherein the laterally extending, grapple fixture recess engaging, rounded shoulder is one of a plurality of laterally extending, grapple fixture recess engaging, rounded shoulders extending around circumferentially spaced portions of the cylindrical base and secured against relative movement to the abutment face.

4. A grapple fixture according to claim 1, wherein the cone-shaped body has a truncated apex, and a grapple probe with an enlarged head portion is provided extending outwardly from the truncated apex.

5. A grapple fixture according to claim 1, wherein the trunnion has a rounded, end effector engaging surface.

6. A grapple fixture according to claim 1, wherein the rounded shoulder is spherical.

* * * * *